United States Patent
Balcha et al.

(10) Patent No.: US 11,880,282 B2
(45) Date of Patent: Jan. 23, 2024

(54) CONTAINER-BASED APPLICATION DATA PROTECTION METHOD AND SYSTEM

(71) Applicant: Trilio Data, Inc., Framingham, MA (US)

(72) Inventors: Muralidhara R. Balcha, Holliston, MA (US); Prashanto Jairaj Kochavara, Boston, MA (US); David Safaii, Sherborn, MA (US)

(73) Assignee: Trilio Data, Inc., Framingham, MA (US)

( * ) Notice: Subject to any disclaimer, the term of this patent is extended or adjusted under 35 U.S.C. 154(b) by 20 days.

(21) Appl. No.: 17/476,393

(22) Filed: Sep. 15, 2021

(65) Prior Publication Data

US 2023/0082186 A1 Mar. 16, 2023

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 11/1461* (2013.01); *G06F 2201/80* (2013.01)

(58) Field of Classification Search
CPC ............. G06F 11/1469; G06F 11/1451; G06F 11/1461; G06F 2201/80
See application file for complete search history.

(56) References Cited

U.S. PATENT DOCUMENTS 7,370,164 B1 5/2008 Nagarkar et al.
8,332,689 B2 12/2012 Timashev et al.
(Continued)

FOREIGN PATENT DOCUMENTS

KR 10-2016-0078795 A 7/2016

OTHER PUBLICATIONS

Dolan, Robin Storage for Containers: Enabling Stateful Applications on Kubernetes, Jul. 2019, 5 pages, Technical Review, Stohttps://2xerel14930d1fz9y03lx986-wpengine.netdna-ssl.com/wp-content/uploads/2019/11/esg-technical-review-robin-storage-technical-review.pdf; retrieved Mar. 15, 2021.

(Continued)

*Primary Examiner* — Loan L. T. Truong
(74) *Attorney, Agent, or Firm* — Goodwin Procter LLP

(57) ABSTRACT

A computer-implemented method of continuous restore for containerized applications includes initiating a continuous restore process for a containerized application having an application template and application data, where the containerized application executes on a first cluster. A backup plan for the containerized application is generated. A persistent volume containing the application data in the first cluster is identified and some of the application data is moved from the persistent volume to a backup target based on the backup plan schedule. The backup plan is received at a data synch process executing on a second cluster. A persistent volume is created on the second cluster. Some of the application data is moved from the backup target to the created persistent volume on the second cluster based on the backup plan schedule. The containerized application is recovered at the second cluster based on some of the application data moved to the persistent volume on the second cluster by the data synch process such that the recovered containerized application is operational at the most recent backup point-of-time of the backup plan schedule.

22 Claims, 11 Drawing Sheets

(56) References Cited

U.S. PATENT DOCUMENTS

| | | | |
|---|---|---|---|
| 8,402,309 | B2 | 3/2013 | Timashev et al. |
| 8,464,092 | B1 | 6/2013 | Gentes et al. |
| 8,566,640 | B2 | 10/2013 | Timashev et al. |
| 8,966,318 | B1 | 2/2015 | Shah |
| 9,104,624 | B2 | 8/2015 | Timashev et al. |
| 9,270,750 | B1 | 2/2016 | Biberman et al. |
| 9,378,121 | B2 | 6/2016 | Timashev et al. |
| 9,392,054 | B1 | 7/2016 | Biberman et al. |
| 9,471,441 | B1 | 10/2016 | Lyadvinsky et al. |
| 9,760,448 | B1 | 9/2017 | Per et al. |
| 9,843,533 | B2 | 12/2017 | Turovsky et al. |
| 9,922,033 | B1 | 3/2018 | Odedra |
| 10,025,836 | B2 | 7/2018 | Batchu et al. |
| 10,379,892 | B2 | 8/2019 | Kripalani |
| 10,402,187 | B2 | 9/2019 | Turovsky et al. |
| 10,437,487 | B2 | 10/2019 | Balcha et al. |
| 10,437,681 | B2 | 10/2019 | Balcha et al. |
| 10,776,321 | B1 | 9/2020 | Balcha et al. |
| 11,288,130 | B2 * | 3/2022 | Balcha ................ G06F 11/1458 |
| 11,550,491 | B2 * | 1/2023 | Beedu .................... G06F 3/065 |
| 11,567,757 | B2 * | 1/2023 | Raghavan ................ G06F 8/71 |
| 11,586,507 | B2 * | 2/2023 | Balcha ................ G06F 11/1464 |
| 2009/0276591 | A1 | 11/2009 | Mu et al. |
| 2012/0066677 | A1 | 3/2012 | Tang |
| 2012/0233228 | A1 | 9/2012 | Barton et al. |
| 2014/0310370 | A1 | 10/2014 | Hendel et al. |
| 2015/0127612 | A1 | 5/2015 | Balcha et al. |
| 2016/0034481 | A1 | 2/2016 | Kumarasamy et al. |
| 2016/0132310 | A1 | 5/2016 | Koushik et al. |
| 2017/0192825 | A1 | 7/2017 | Biberman et al. |
| 2017/0244593 | A1 | 8/2017 | Rangasamy et al. |
| 2017/0318119 | A1 | 11/2017 | Zbiljic |
| 2018/0137139 | A1 | 5/2018 | Bangalore et al. |
| 2018/0285199 | A1 * | 10/2018 | Mitkar ................ G06F 11/2048 |
| 2019/0065323 | A1 * | 2/2019 | Dhamdhere ........ G06F 11/1484 |
| 2019/0146885 | A1 | 5/2019 | Chen |
| 2019/0384495 | A1 | 12/2019 | Balcha |
| 2019/0384956 | A1 * | 12/2019 | Whelan, III ....... G06V 40/1382 |
| 2020/0042632 | A1 * | 2/2020 | Natanzon ............ G06F 11/1451 |
| 2020/0136987 | A1 * | 4/2020 | Nakfour .............. H04L 67/1097 |
| 2020/0241754 | A1 * | 7/2020 | Bett ...................... G06F 9/5077 |
| 2021/0011811 | A1 * | 1/2021 | Balcha ................ G06F 11/1456 |
| 2021/0011816 | A1 * | 1/2021 | Mitkar ................ G06F 11/1484 |
| 2021/0149769 | A1 * | 5/2021 | Balcha ................ G06F 11/1469 |
| 2021/0173713 | A1 * | 6/2021 | Lei ........................ G06F 9/5027 |
| 2022/0058498 | A1 * | 2/2022 | Rane ..................... G06F 3/0619 |
| 2022/0156129 | A1 * | 5/2022 | Li ............................ G06F 9/542 |
| 2022/0206902 | A1 * | 6/2022 | Hoang .................... G06F 9/541 |
| 2022/0247684 | A1 * | 8/2022 | Andersson ............ H04L 45/745 |
| 2022/0278927 | A1 * | 9/2022 | Mariappan .............. H04L 45/02 |
| 2022/0350492 | A1 * | 11/2022 | Beedu .................... G06F 3/065 |
| 2022/0374282 | A1 * | 11/2022 | Caine .................... G06F 9/4881 |
| 2022/0391294 | A1 * | 12/2022 | Kulkarni ................. G06F 9/54 |
| 2023/0014233 | A1 * | 1/2023 | Xiang ................. G06F 11/1448 |
| 2023/0032682 | A1 * | 2/2023 | Concha ................. G06F 16/185 |

OTHER PUBLICATIONS

Robin., "13. Backup and Restore Applications", https://docs.robin.io/storage/5.3.4/apps.html#/helm-releases; retrieved Mar. 15, 2021, 1 page.

Robin., "10. Managing Stateful Applications", https://docs.robin.io/storage/5.3.4/backup.html; retrieved Mar. 15, 2021, 1 page.

Notification of Transmittal of the International Search Report and the Written Opinion of the International Searching Authority, or the Declaration for International Patent Application No. PCT/US2020/060664, dated Mar. 2, 2021, 10 pages, ISA/KR, Korean Intellectual Property Office, Daejeon, Republic of Korea.

Notification of Transmittal of the International Search Report and the Written Opinion of the International Searching Authority, or the Declaration for International Patent Application No. PCT/US2020/041203, dated Oct. 22, 2020, 12 pages, International Searching Authority, Korean Intellectual Property Office, Daejeon, Republic of Korea.

https://github.com/danilp/yas3fs; downloaded Sep. 22, 2019, 11 pages.

Fuse Over Amazon—s3fs-fuse Wiki—GitHub, downloaded Sep. 22, 2019, 12 pages; https://github.com/s3fs-fuse/s3fs-fuse/wiki/Fuse-Over-Amazon.

Non Final Office Action received for U.S. Appl. No. 16/439,042 dated Dec. 28, 2020, 19 pages.

Final Office Action received for U.S. Appl. No. 16/439,042 dated Jul. 22, 2021, 15 pages.

* cited by examiner

CONTAINER-BASED APPLICATION DATA PROTECTION METHOD AND SYSTEM

The section headings used herein are for organizational purposes only and should not be construed as limiting the subject matter described in the present application in any way.

INTRODUCTION

OpenStack and other cloud-based deployments are growing at an astounding rate. Furthermore, these deployments are relying more on containerized applications. Market research indicates that a large fraction of enterprises will be deploying some form of cloud infrastructure to support applications services, either in a public cloud, private cloud, or some hybrid of a public and a private cloud. This trend leads an increasing number of organizations to use this type of open-sourced cloud management and control software to build out and operate these clouds.

Data loss and application disruption is a major concern for enterprises deploying this and other cloud management and control software. Unscheduled downtime has a dramatic financial impact on businesses. As such, data protection methods and systems, including disaster recovery solutions, are needed which recover from outage scenarios for application workloads executing on OpenStack® clouds and/or clouds that execute over containerized environments that use, e.g., Kubernetes® and/or OpenShift®. Many backup solutions provide for restoration only at intermittent intervals. While those intervals can, in some cases, be predetermined, controlled and managed, this can limit the application for critical data loss and application disruption prevention and mitigation. The ability to provide continuous restoration for an application backup can substantially reduce data loss and application disruption for data protection applications and services.

One challenge is that the systems and applications being protected may scale to very large numbers of nodes and those nodes may be widely distributed. Thus, data protection continuous restore systems must be able to scale rapidly both up and down to effectively work across cloud-based application deployments.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

DESCRIPTION OF VARIOUS EMBODIMENTS

Figure 1A:
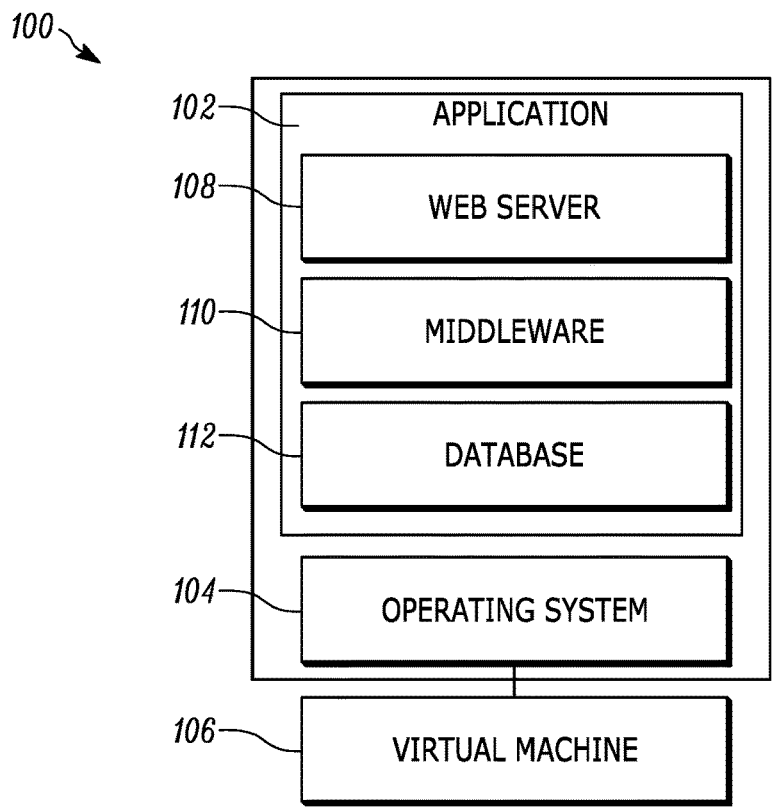
FIG. 1A illustrates a stack for an application that executes using a virtual machine.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the system and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Data protection, including disaster recovery and continuous restore, has become an important challenge as enterprises evolve OpenStack, OpenShift, and/or Kubernetes and similar projects from evaluation to production. Corporations protect data using backup and recovery solutions to recover data and applications in the event of total outage, data corruption, data loss, version control (roll-back during upgrades), and other events. Software developers utilize data protection techniques for, e.g. version control, quality assurance and other development activities. Organizations typically use internal service-level agreements for recovery and corporate compliance requirements as a means to evaluate and qualify backup and recovery solutions before deploying the solution in production.

Continuous restore for an information technology infrastructure can involve the recovery and/or continuation of vital applications and systems following a natural or human-induced disaster. A continuous restore use case can often be associated with business-critical applications that cannot suffer any downtime. These applications require 100% uptime, and in the event of a disaster, the application is expected to failover to a remote site almost instantaneously and without suffering any data loss.

One feature of the present teaching is that it provides a backup media continuous restore for cloud-based infrastructure. The continuous restore system and method of the present teaching is efficient and effective for hybrid clouds. This is because the system and the method of the present teaching can operate with multiple, and/or different control planes. The continuous restore system and method of the present teaching is efficient and effective for containerized applications at least because it can restore in connection with an application template associated with containerized applications. This is important, because containerized applications have features that can make traditional continuous restore solutions unwieldy, slow and not scalable.

One feature of the present teaching is that it provides robust application-specific backup and restore workflows that can handle different application types, including helm releases, operators, labels, and namespaces. However, support for additional application types are also possible. This can be particularly important as the Kubernetes platform evolves into a more mature platform with additional application types. For example, as Kubernetes is evolving into a multi-cloud management platform, continuous restore use for such platforms is becoming critical for organizations with cloud-based infrastructures. New solutions are needed to address multi-cloud use cases, including application mobility, continuous restore, and multi-cloud data management. Continuous restore workflows of the present teaching can address this need.

Cloud-based systems offer some application programming interfaces (APIs) that can be used to generate a backup. However, these APIs alone are not sufficient to implement and manage a complete backup solution, nor a more complex disaster recovery, failover, solution. In addition, each cloud deployment is unique, at least in part because the systems are modular, with multiple options to implement cloud-based applications and containerized applications. Users have a choice of various hypervisors, storage subsystems, network vendors, projects, and various open source management and orchestration platforms.

One feature of the method and system of the present teaching is that it supports continuous restore for hybrid clouds and for container-based workloads. Hybrid clouds include cloud resources and services that combine at least one or more of private cloud resources, third-party cloud resources, public cloud resources, on-premise resources, and/or other cloud-based resources and services. Hybrid clouds may also include at least one or more cloud orchestration platforms.

The method and system of the present teaching supports continuous restore for hybrid cloud-based information systems that utilize container-based applications. The technology supports, for example, OpenStack and Red Hat® Virtualization environments, and allows systems to recover from disasters, migrate tenant workloads, move workloads to new infrastructures and migrate to new infrastructure software distributions.

In addition, the method and system of the present teaching provides continuous restore for distributed computing environments, such as private and public clouds, private data centers and hybrids of these environments. One feature of the method and system of the present teaching is that it can provide continuous restore operations using object storage systems as a backup target, or repository. For example, the system and method of the present teaching may utilize scalable cloud-based backup and restoration methods as described in, for example, U.S. Provisional Patent Application Ser. No. 62/873,618, entitled "Scalable Cloud-Based Backup Method" and in U.S. patent application Ser. No. 17/098,668, entitled Container-Based Application Data Protection Method and System, which are both assigned to the present assignee. The entire contents of U.S. Provisional Patent Application Ser. No. 62/873,618 and U.S. patent application Ser. No. 17/098,668 are incorporated herein by reference. While there are some advantages to using object storage systems as a backup target in today's cloud environment, it is understood by those skilled in the art that the present teaching is not so limited. In addition, or alternatively, to object storage, the method and system of the present teaching can provide continuous restore operations using, for example, NFS storage as a backup target.

The application and system being recovered in various embodiments of the present teaching can be part of a cloud computing system, such as, for example, a system that is executing a Kubernetes and/or OpenShift software platform in a cloud environment. Kubernetes is an open-source project and framework for cloud computing for container orchestration and automated application deployment, scaling and management. Kubernetes is also referred to as K8s. OpenShift is open source software offered by Red Hat that is a container application platform based on top of Docker® containers and Kubernetes container cluster manager platforms. It should be understood that the present teachings are not limited to use with Kubernetes and/or OpenShift software platforms and that they can apply to any type of cloud-based computing system and/or container environment that makes virtual servers and other virtual computing resources available as a service or platform to customers.

The method and system of the present teaching applies to continuous restore of applications and associated workloads implemented in any combination of the configurations described herein. As will be clear to those skilled in the art, various aspects of the system and various steps of the method of the present teaching are applicable to various types of computing environments, including computing resources and services available in private and public data centers and/or cloud and/or enterprise environments. Various aspects of the system and various steps of the method of the present teaching are applicable to various known control and management software platforms and services.

The present teaching is described herein with respect to both applications and workloads. In general, an application represents software that performs a desired function. A workload, which is sometimes referred to as an application workload, also includes all the resources and processes that are necessary, or utilized, to make the application run. This can include, for example storage and/or network resources. A feature of the data protection method and system of the present teaching is that it not only provides for data protection of the application, but also for data protection of the workload associated with that application. A user or end system may, in some methods, specify the scope of the data protection. Thus, it should be understood that reference to application, application workload, or workload in a particular description does not necessarily limit the scope of the present teaching. However, an important feature of the present teaching is the recognition that information systems are now reliant on workloads to perform computing tasks, and these workloads represent a more complex set of functions and services than, for example, a set of individual applications and associated data that run on individual machines. Thus, recovering a computer system requires more than backing up a collection of applications and/or data. It also requires information on the management structure, connectivity and/or associated data to be included as part of the backup process. The computer-implemented method of continuous restore for containerized applications of the present teaching addresses the challenges in providing effective and complete backup, migration, and/or restoration of the applications and services that run on these platforms.

Another feature of the present teaching is the recognition that modern applications executing on virtual machines and/or using containers have an associated and integral management structure/information that is needed to execute them. This management structure is provided, in some cases, by templates. An example template is the Helm® chart in Kubernetes. An effective and efficient backup and restoration solution needs to appropriately discover and maintain this additional information associated with the template (or other management structure), as well as the associated data of the application. Thus, as one example, some embodiments of the present teaching create a backup manifest that maintains the relevant information to back up and/or restore not only application data, but necessary configuration information to run the application at the desired point in time.

Another feature of the present teaching is that it supports application workload backup and restoration for applications executing on virtual machines. FIG. 1A illustrates a stack 100 for an application that runs using a virtual machine. As can be seen from the figure, the application 102 is set monolithically over the operating system 104 that is executing on a virtual machine 106. The application services include web server 108, middleware 110, and database 112 services that run using the operating system 104.

Figure 1B:
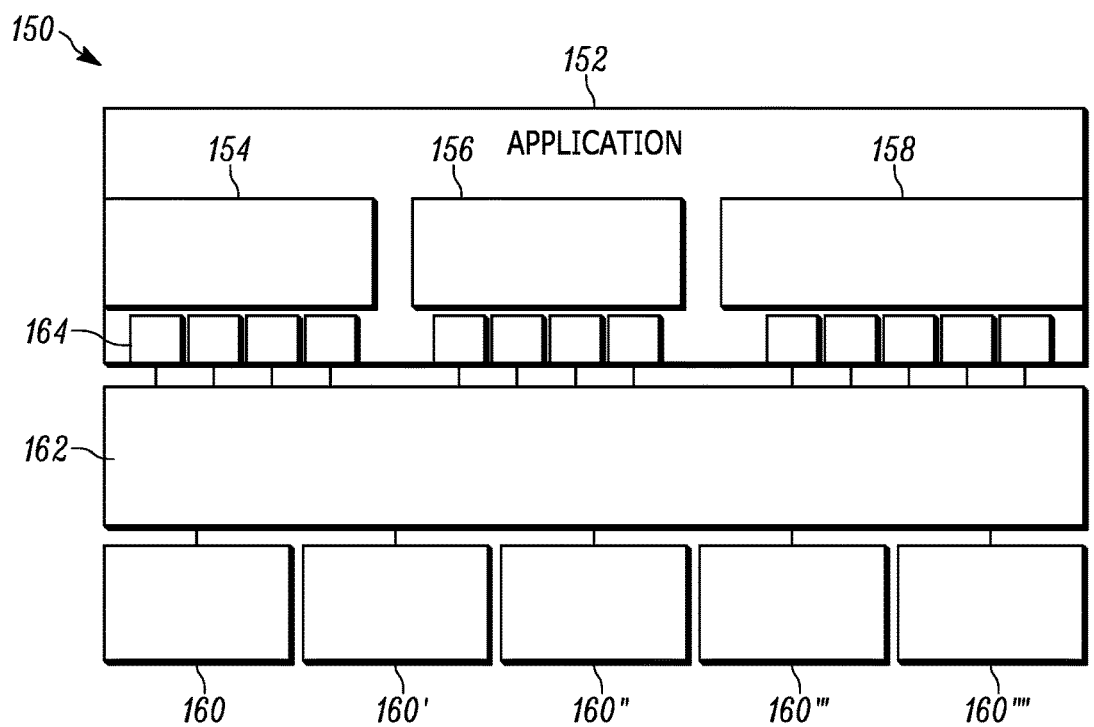
FIG. 1B illustrates a stack for a containerized application that executes using a container system.

Another feature of the present teaching is that it supports application workload backup and restoration for applications executing using containers that execute on virtual machines and/or physical machines. FIG. 1B illustrates a stack 150 for a containerized application 152 that runs using a container system. The application 152 includes microservices 154, 156, 158 connected to processing machines 160, 160', 160", 160'", 160"" via a container management system 162. In various embodiments, the processing machines 160, 160', 160", 160'", 160"" can be physical machines or virtual machines or a combination. The container management system 162 is connected to the various services 154, 156, 158 of the application 152 using various computing units 164. The computing units 164 generally include one or more containers that are typically collocated and scheduled as a unit to support a particular compute capability, or set of capabilities (e.g. networking, processing, storage) that are needed for the various services 154, 156, 158 to which they connect. The container management system 162 manages the computing units 164 that run on the computing resources provided by the underlying processing machines 160, 160', 160", 160'", 160"".

Figure 2:
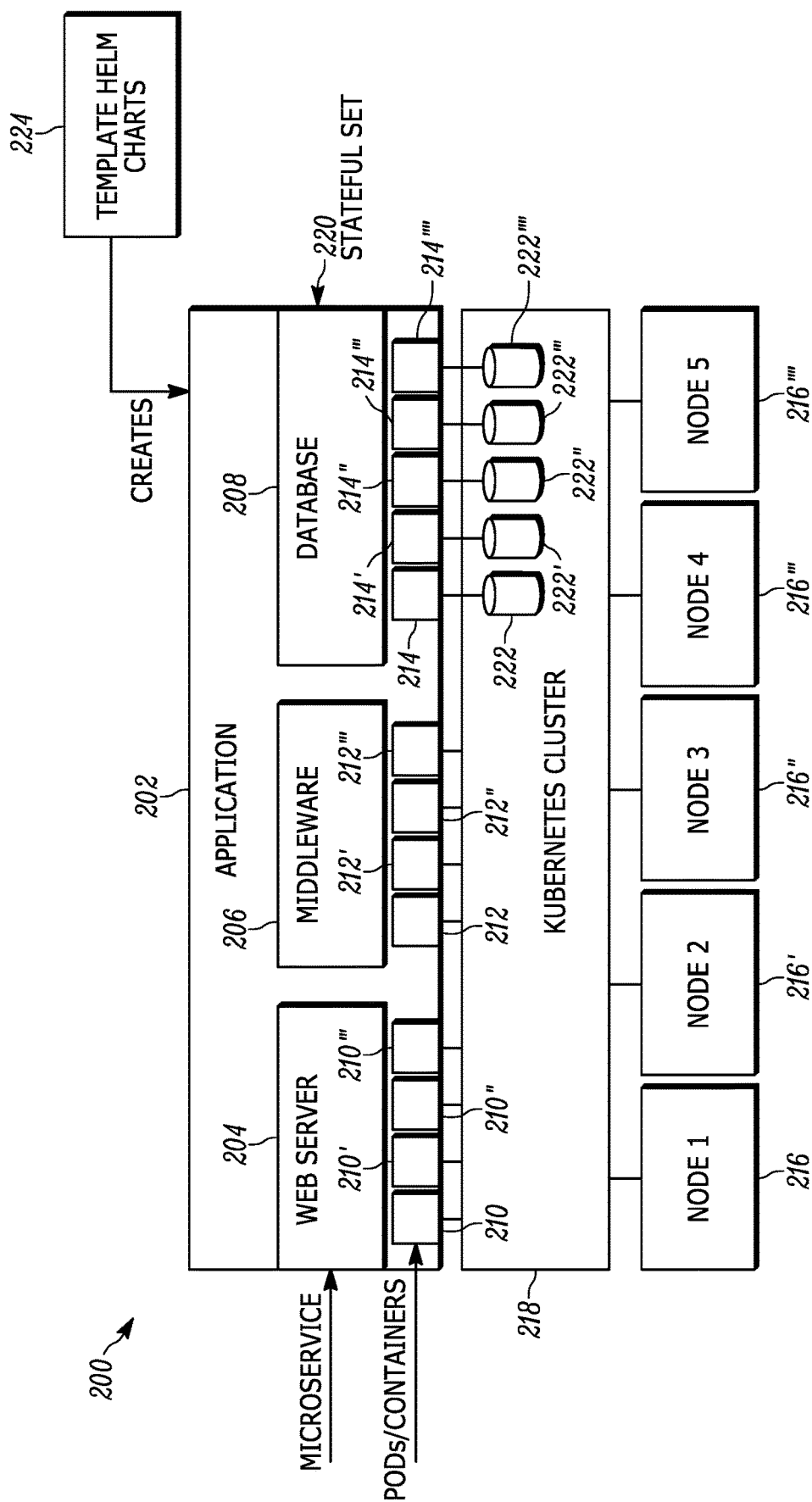
FIG. 2 illustrates a containerized application stack for an application that is included in a continuous restore policy executing on a Kubernetes cluster of the present teaching.

FIG. 2 illustrates a containerized application stack 200 for an application that is included in a continuous restore policy executing on a Kubernetes cluster of the present teaching. The application 202 includes three microservices, a web server service 204, a middleware service 206, and a database service 208. Each microservice 204, 206, 208 runs using multiples pods. A pod is the smallest deployable computing unit in a Kubernetes environment. Generally, a pod is a module of network, compute, storage and application components that work together to deliver a computer processing application or service. As understood by those skilled in the art, the term pod, which arose from the acronym for point of delivery, is used to describe the computing unit at least in part because the resources used to execute a pod can represent a wide variety of computing infrastructure. In Kubernetes, a pod is a grouping of one or more containers that operate together. The web server service 204 uses four pods 210, 210', 210", 210'". The middleware service 206 uses four pods 212, 212', 212", 212'". The database service 208 uses five pods 214, 214', 214", 214'", 214"". In some embodiments, each pod comprises one or more Docker containers, which is a set of coupled software-as-a-service and platform-as-a-service products that use operating-system-level virtualization to develop and deliver software in containers. The pods 210, 210', 210", 210'", 212, 212', 212", 212'", 214, 214', 214", 214'", 214"" run on five Kubernetes nodes 216, 216', 216", 216', 216', that may be virtual processing machines or physical processing machines. A Kubernetes cluster 218 manages the pods 210, 210', 210", 210'", 212, 212', 212", 212'∝1, 214, 214', 214", 214'", 214"" and the nodes 216, 216', 216", 216'", 216"". The Kubertnetes cluster 218 includes a control plane, that is a collection of processes executing on the cluster, and a master that is a collection of three processes that run on a single one of the nodes 216, 216', 216", 216'", 216"" on the cluster. The three processes for the master are an API server, controller manager, and a scheduler.

Each application pod 210, 210', 210", 210'", 212, 212', 212", 212'", 214, 214', 214", 214'", 214"" may have an associated stateful data set, and thus, an associated persistent storage volume. This is sometimes referred to as a persistent volume or PV.

Comparing stack 200 with the generalized container application stack 150 of FIG. 1B, and referring to both FIG. 1B and FIG. 2, the computing units 164 are equivalent to the pods 210, 210', 210", 210'", 212, 212', 212", 212'", 214, 214', 214", 214'", 214"". The management system 162 is equivalent to the Kubernetes cluster 218. The underlying processing machines 160, 160', 160", 160'", 160"" are equivalent to the nodes 216, 216', 216", 216'", 216"".

Managing storage is distinct from managing computation. A persistent volume (PV) may be a piece of storage in a Kubernetes cluster. The Kubernetes application 202 has a stateful set 220 for the database service 208. The database service 208 pods 214, 214', 214", 214'", 214"" require ordering and uniqueness. Each pod 214, 214', 214", 214'", 214"" has an associated persistent volume 222, 222', 222", 222'", 222"" in the Kubernetes cluster 218. In some embodiments, the persistent volumes are pieces of storage in the cluster that may be provisioned statically by an administrator, or dynamically provisioned using storage classes, or profiles of the storage based on, for example, quality of service, type, and/or backup or other policies.

In some embodiments, the application 202 is created from a template Helm chart 224. Helm is an open-source package manager for Kubernetes. Helm uses Helm charts, such as template Helm chart 224. In general, Helm charts are used to define, install and upgrade Kubernetes applications. Each Helm chart is a collection of files in a directory that describe a related set of Kubernetes resources. Helm charts can be simple or complex where they contain many resources. Each Helm chart contains version information in a Chart.yaml file. One feature of the system and method to protect data of the present teaching is that it can be run on a Kubernetes cluster.

The application 202 described in connection with FIG. 2 may be an application that is part of a failover operation of various embodiments of the method and system of the present teaching. In addition, or instead, the application 202 described in connection with FIG. 2 may be an application that is executing the failover function of various embodiments of the method and system of the present teaching. A feature of applications configured according to an embodiment of FIG. 2 is a cloud-native system that can scale rapidly and efficiently up to large sizes and down to small sizes of nodes and/or other computing elements.

Figure 3:
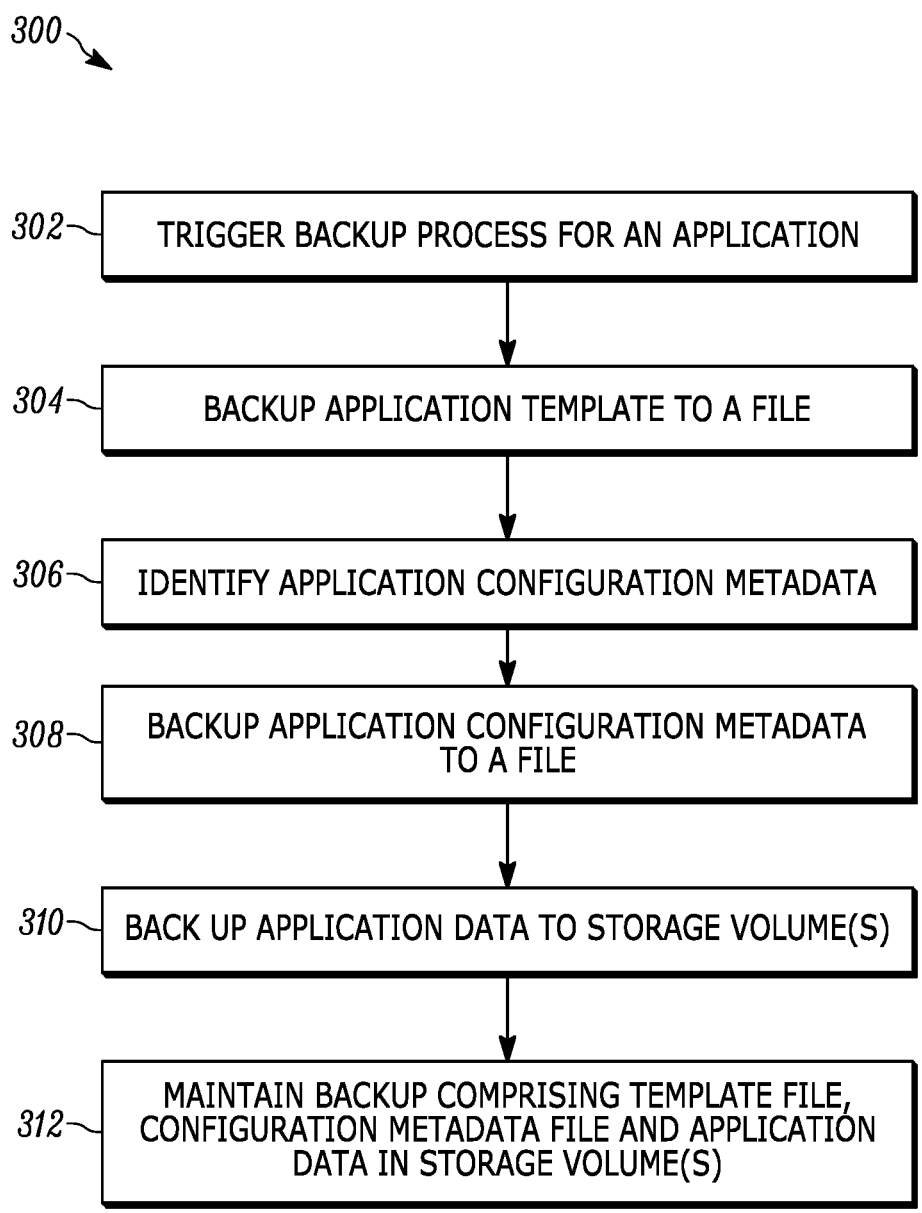
FIG. 3 illustrates a flow diagram for an embodiment of a method of container-based application data protection backup in a continuous restore method of the present teaching.

FIG. 3 illustrates a flow diagram 300 for an embodiment of a method of container-based application data protection backup in a continuous restore method of the present teaching. The application to be backed up is defined by a template. The template can include, for example, the number of virtual machines (VMs), what kind of VM, VM operating system, network identifiers for one or more networks being used, storage identifiers for one or more storage systems being used, various IP addresses, and/or other details about the configuration of the infrastructure that is supporting the application. The templates can be, for example, Helm charts (Kubernetes), terraforms (Hashi Corp.), cloud formation (Amazon), and/or Heat (Open Stack).

In a first step 302, a backup process is triggered. The trigger for a backup can take many forms including, for example, being a scheduled trigger, trigger or triggers that are defined by a policy, user initiated, one-click initiated, and other forms of triggers. The trigger can occur on a regular time pattern, or the trigger can occur at random times. The trigger can be initiated by a command in a Helm chart or other template. The trigger can be initiated from a graphical user interface (GUI).

In a second step 304, the defined application template is backed up to a file. In a third step 306, the application's configuration metadata is identified. This configuration identification step 306 may include, for example, a discovery process on the cloud-based infrastructure to determine the application's configuration metadata. The discovery process in some embodiments is guided by the application template information. In a fourth step 308, the applications' configuration metadata identified in the third step 306 is backed up to a file.

In a fifth step 310, the application data is backed up to a storage volume, or volumes. In some embodiments, the stateful set of services of the application are determined and the data in the storage volumes associated with the application are stored in a backup storage volume. In a sixth step 312, the backup comprising the template file, the configuration metadata file, and the application data is maintained.

The backup processes used in the backup steps of the method flow diagram 300 can utilize, for example, the backup process described in U.S. Provisional Patent Application Ser. No. 62/873,618, which is incorporated herein by reference. The backups may be incremental or full backups at various back up times, as understood by those skilled in the art.

Figure 4:
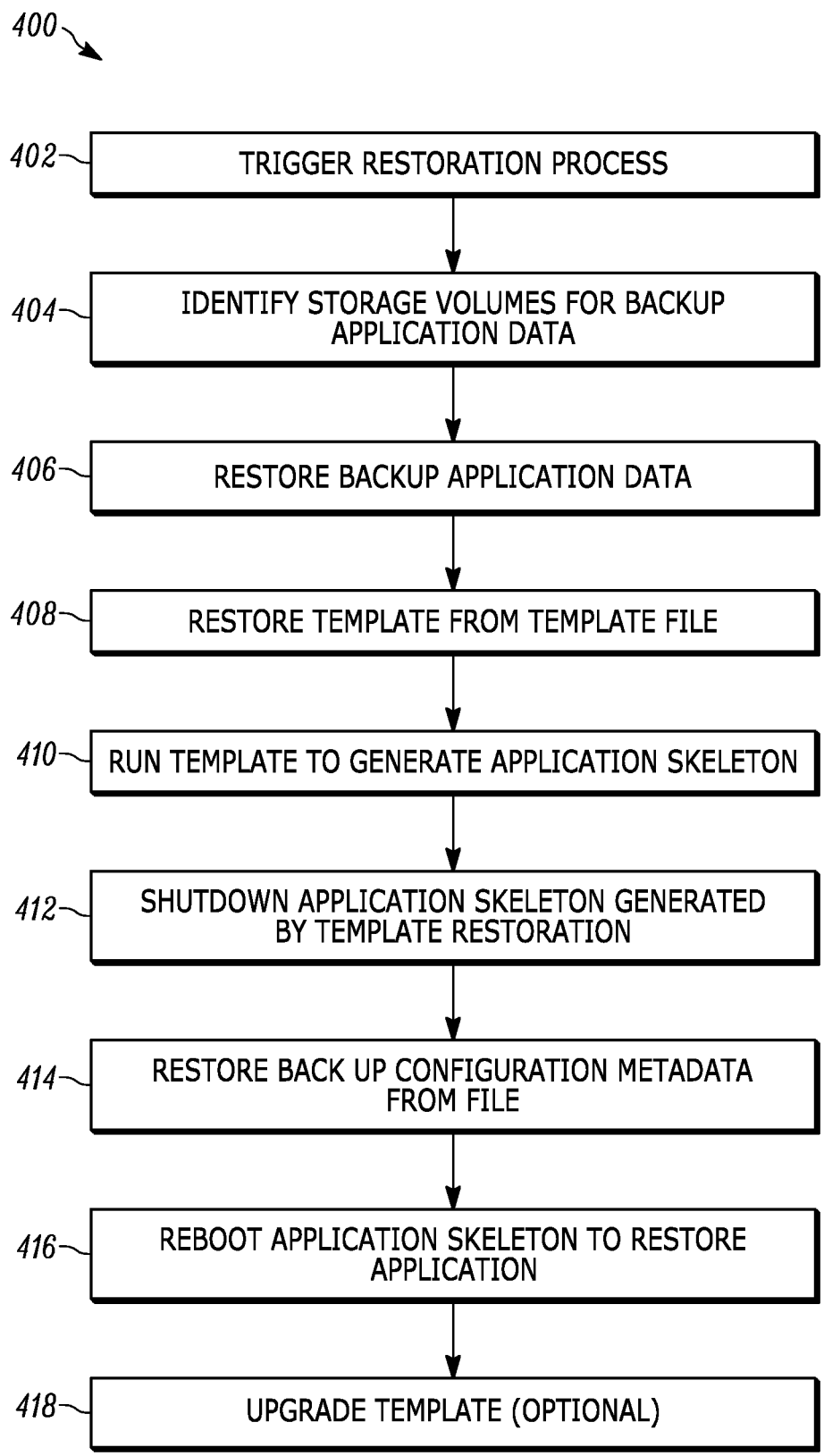
FIG. 4 illustrates a flow diagram for an embodiment of a method of container-based application data protection restore in a continuous restore method of the present teaching.

FIG. 4 illustrates a flow diagram 400 for an embodiment of a method of container-based application data protection restore in a continuous restore method of the present teaching. The restore process in flow diagram 400 can work with the files and backup storage volumes that were generated in the method of container-based workload data protection backup described in connection with FIG. 3.

Referring to both FIGS. 3 and 4, in a first step 402, a restore process is triggered. The trigger for the restoration can take many forms including, for example, being a scheduled trigger, trigger or triggers that are defined by a policy, user initiated, one-click initiated, and other forms of triggers. The trigger can occur on a regular time pattern, or the trigger can occur at random times. The trigger can be initiated by a command in a Helm chart or other template. The trigger can be initiated by a graphical user interface.

One feature of the present teaching is that it supports a simple restore initiation. In some embodiments of the method of the present teaching, an entire application is restored from a point-in-time. In other embodiments, a policy-based global job scheduling initiates the restoration. In yet other embodiments, restoration is initiated with a single click. In some embodiments, restoration is provided with a copy to a new location or availability zone. Also, in some embodiments, the restore process migrates an application or applications to a new Kubernetes cluster.

In a second step 404, the restore storage volumes for the application data being restored are identified. In a third step 406, the application data is restored from backup storage volumes. The backup storage volumes and backed up application data may have been generated in a backup step 310 and maintained in step 312 of the backup method flow diagram 300 described in connection with FIG. 3.

In a fourth step 408, the template is restored using the template file. Referring to back to FIG. 3, the template file may have been created by a backup process step 304 and maintained in step 312 in the backup method flow diagram 300. In a fifth step 410, the template file is run to generate an application skeleton. By application skeleton, we mean the application does not yet have any data. In a sixth step 412, the generated application skeleton is shut down.

In a seventh step 414, the backup configuration metadata is restored from a file. Again, referring back to FIG. 3, the file may be the application configuration metadata file generated in step 308 and maintained in step 312 of the backup method flow diagram 300.

In an eighth step 416, the application skeleton is rebooted. The reboot of the application skeleton thus successfully restores the application and its associated stateful information associated with the particular backup information (files and data in storage volumes) that was chosen to be restored. In some embodiments, various steps of the method utilize the restore techniques as described in U.S. Provisional Patent Application Ser. No. 62/873,618. Restorations can proceed with any backup point in time as desired and available.

In an optional step 418, the application template is upgraded. For example, an upgrade can be desired if a new version of software involved in the application workload is available, and the upgrade will move the version of the restored upgraded application to the new version.

Figure 5:
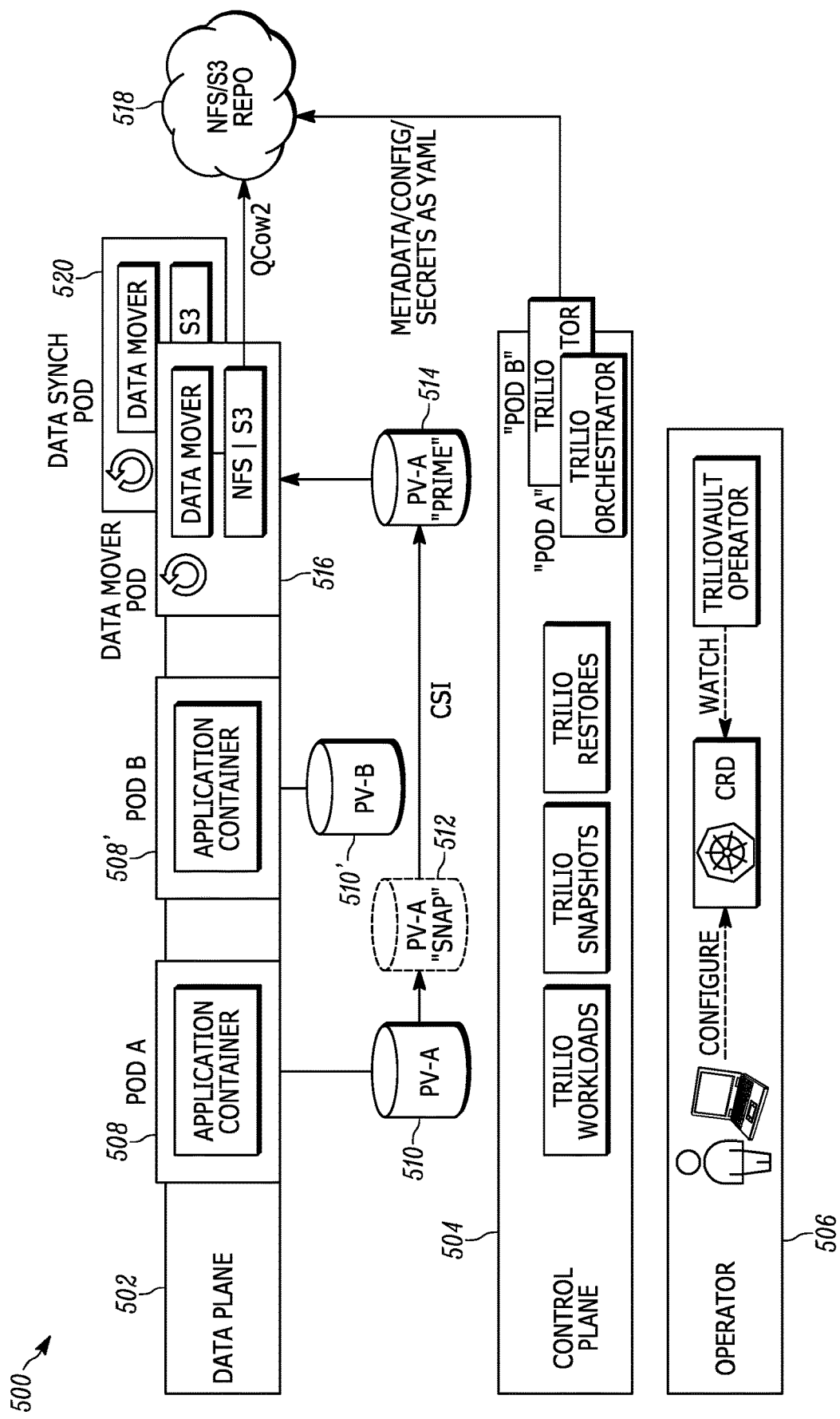
FIG. 5 illustrates a system diagram for an embodiment of a container-based application workload data protection and continuous restore of the present teaching.

FIG. 5 illustrates a system diagram 500 for an embodiment of a container-based application workload data protection and continuous restore system of the present teaching. Embodiments of the method and system for continuous restore of the present teaching can include not only traditional backup and restoration of the data plane 502, but also backup of the control plane 504 and of the operator layer 506 information. This approach is particularly useful for systems that run and/or develop applications using a container-based approach. Application pods 508, 508', Pod A and Pod B, have stateful information data in persistent volumes 510, 510', PV-A, PV-B. In some embodiments the persistent volumes 510, 510' are network file system (NFS). For a data backup, a snapshot 512 of PV-A volume 510 can be created and a new persistent volume 514 is created from the snapshot. The new persistent volume 514 is attached to a data mover pod 516. The data mover service copies the persistent volume 514 to a repository 518. A data synch pod 520 also performs reads and writes with repository 518. The data synch pod 520 is spun up to synchronize existing PV data from the latest backup images to a remote site PV as described herein.

A data synch pod 520 exists at sites that are acting as remote sites for applications subject to continuous restore policy. A data mover pod 516 exists at sites that are acting as production sites for applications subject to continuous restore policy. In general, a single site can be a remote site, a production site or both. Different applications may be considered remote or production, even if they are on a same site. Thus, a single site may have data mover pods 516 associated with a production site application slated for recovery operations, and the site may have data synch pods 520 associated with a remote site application slated for recovery operations.

Note that there is generally no limitation on the number of production clusters and remote clusters. In fact, no cluster is designated as a production cluster or a remote cluster. A cluster may be a production cluster for one application and may act as a standby (remote) cluster for another application. As understood by those skilled in the art, various applications may be arranged within a cluster and/or within a namespace that is part of a cluster, depending on the structure of the applications within a particular Kubernetes framework.

The continuous restore system 500 is flexible and supports multiple protocols for distributed storage to act as a repository 518. The repository 518 may be, for example, Amazon simple storage service (S3) or another repository. In some embodiments, the file format may be QCOW2 for backup images. QCOW2 is a known file format for disk image files. QCOW stands for QEMU copy-on-write, where QEMU (Quick EMUlator) is an open source machine emulator and virtualizer.

For the control plane 504 backup and restoration, a variety of application-related configuration information, secrets information (e.g. passwords, keys and privileges), and metadata are discovered and backed up to the repository 518. For example, this information may be stored in the backup repository 508 as an application information file. This information can be used for the restoration step(s) in recovering an application at a remote site.

At the operator plane 506, application templates are associated with the application to be backed up. These may include a Helm chart or other template. The template may include common resource definitions and other information about the application. This information may be stored as a template file and stored in the repository 518. Thus, one key advantage of the data protection system and method of the present teaching is that, for a particular application to be backed up, not only is the application data backed up, but the template is backed up as well as the configuration metadata information and relevant application information. This information can be used for the restoration step(s) in recovering an application using a restore operation at a remote site. As such, the approach supports fast and efficient continuous restore of applications that run on containers.

Some embodiments of the present teaching use the Helm parser and/or application configuration reader/loaders at setup. A user application deployed using Helm charts should be parsed and generate viable WorkloadCRDs (workload custom resource descriptors). An example workflow proceeds as follows. The user can have following scenarios: 1) application with multiple releases, or 2) application with multiple revisions. An assumption is that a single release will be considered as a single workload.

Creating a workload out of the user application proceeds as follows: 1) get the latest version of the release; 2) since Helm release names are unique across K8s clusters, perform a one-to-one mapping for RELEASE_NAME→TRILIOVAULT_WORKLOAD_NAME; 3) get a list of all the PVs and PVC; and 4) backup the release content directly since it can be created with no dependencies and will be managed differently (release content includes: templates—all the K8s resources like Pods, Sts, Dep, Svc, PV, PVC, Crds, etc., chart metadata, manifests, configuration, dependencies, files, backup PVs and PVC data, as appropriate).

An operator is a method of packaging, deploying and managing a Kubernetes application. A Kubernetes application may be described as an application that is both deployed on Kubernetes and managed using the Kubernetes APIs and kubectl tooling. The operator software development kit (SDK) enables developers to build operators based on their expertise without requiring knowledge of the complexities of the Kubernetes API. The operator lifecycle management oversees installation, updates, and management of the lifecycle of all of the operators (and their associated services) executing across a Kubernetes cluster. Possible user-deployed operators have types, for example: Go, an operator that has the business logic written in Golang to deploy and manage the applications, Helm, and Ansible. Note that a single operator can manage multiple instances of an application.

For embodiments of the present teaching that use Helm charts, the Helm Go Client can be used for all the transactions with Helm charts. See, for example, U.S. patent application Ser. No. 17/098,668, entitled Container-Based Application Data Protection Method and System. U.S. patent application Ser. No. 17/098,668 assigned to the present assignee and is also incorporated herein by reference.

One feature of the present teaching is that it can support continuous restore via either a backup media approach or a storage-level data replication approach described above. Kubernetes is a container orchestration platform that relies on the declarative semantics of the resources to provide a highly reliable and available platform. One feature of the present teaching is the recognition that the declarative nature of the semantics, as opposed to imperative, is useful for defining continuous restore workflows.

A major element of a continuous restore workflow is storage and, for some embodiments this storage can be Kubernetes storage. Kubernetes storage has two important constructs called PhysicalVolume and PhysicalVolumeClaim. A PersistentVolume (PV) is a piece of storage in the cluster that has been provisioned by an administrator or dynamically provisioned using Storage Classes. It is a resource in the cluster, just like a node is a cluster resource. Persistent volumes are volume plugins like Volumes but have a lifecycle independent of any individual pod that uses the PV. This API object captures the storage implementation details, be that NFS, iSCSI, or a cloud-provider-specific storage system.

A PersistentVolumeClaim (PVC) is a request for storage by a user. It is similar to a Pod. Pods consume node resources, and PVCs consume PV resources. Pods can request specific levels of resources (CPU and Memory). Claims can request specific size and access modes (e.g., they can be mounted ReadWriteOnce, ReadOnlyMany, or ReadWriteMany, see AccessModes).

Continuous restore systems and methods of the present teaching can create PV resources for every PV discovered in the backup plan. Different PVCs are created at different points in the workflow for the same PV. For example, a data synch pod PVC is used to transfer backup data to the PV. An Application pod PVC is used while restoring the application.

One embodiment of the present teaching focuses on backup media restoration of the continuous restore use case. For example, assume that there are two Kubernetes clusters, one production and another remote site. A continuous restore application is installed on both clusters, and backup plans are set up for various production cluster applications. The continuous restore application is performing backups at the intervals specified by the backup plan policies. For the argument of simplicity, we also assume that both the clusters are configured to use one backup target (repository), perhaps an S3 bucket, but the present teaching is not so limited.

Figure 6A:
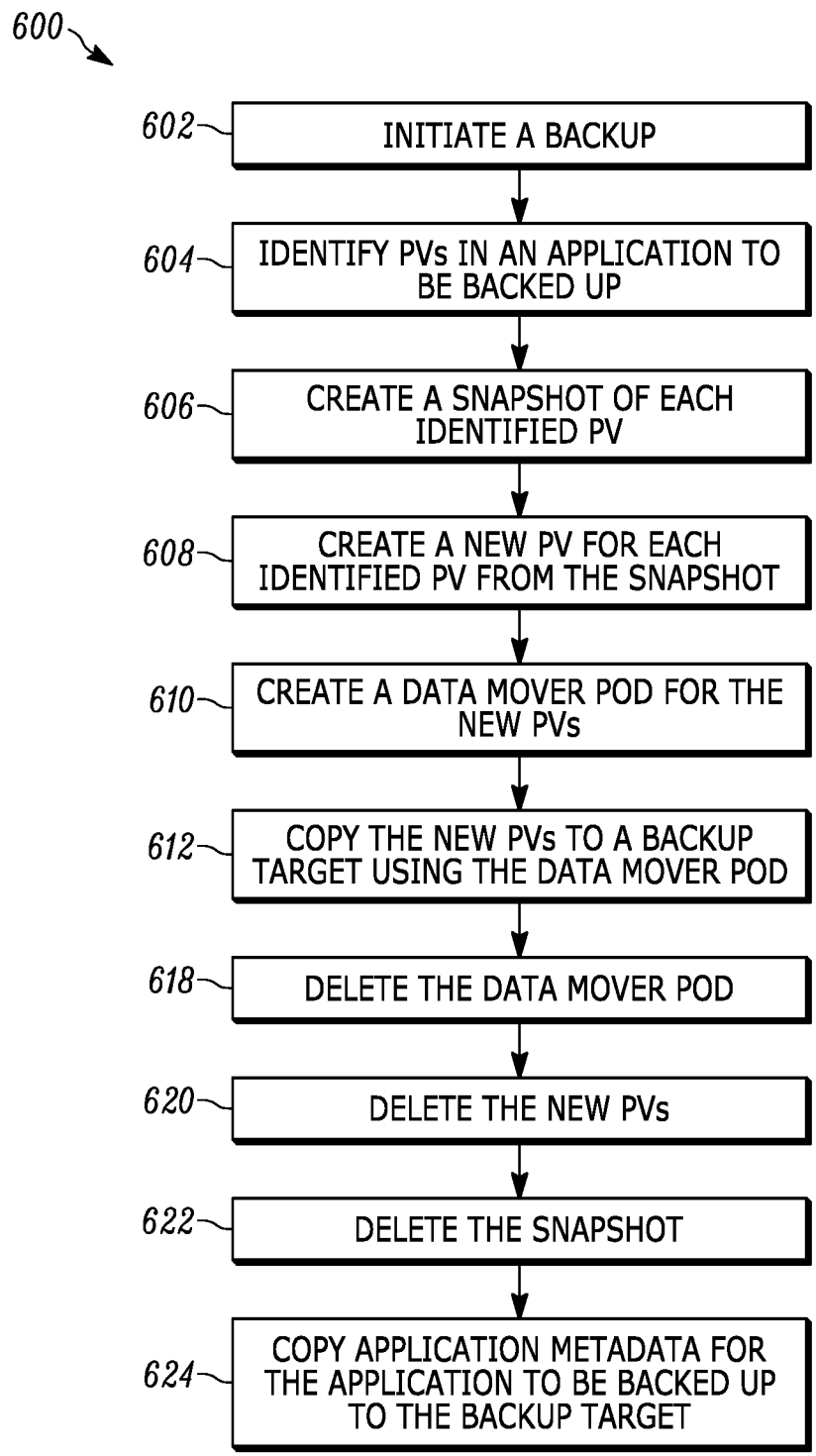
FIG. 6A illustrates a flow diagram for an embodiment of a method of container-based application continuous restore backup of the present teaching.

FIG. 6A illustrates a flow diagram for an embodiment of a method of container-based application continuous restore backup of the present teaching. A backup is initiated in a first step 602. This may be implemented, for example, by user command in a GUI, and/or through a backup plan schedule. In a second step 604, all PVs in the given application to be backed up and subject to continuous restore policy, are identified. In a third step 606 a snapshot of each identified PV is created. In a fourth step 608, a new PV from the snapshot is created. In a fifth step 610 a data mover for every newly created PV is created. In a sixth step 612, the data mover pod copies PV data to backup media. The backup media, also referred to as a backup target, is a storage repository. In a seventh step 618, the data mover pods are deleted after the backup is done. In an eighth step 620, the new PV is deleted. In a ninth step 622, the snapshot is deleted. In a tenth step 624, the application metadata for the application to be backed up is copied to the backup target.

Figure 6B:
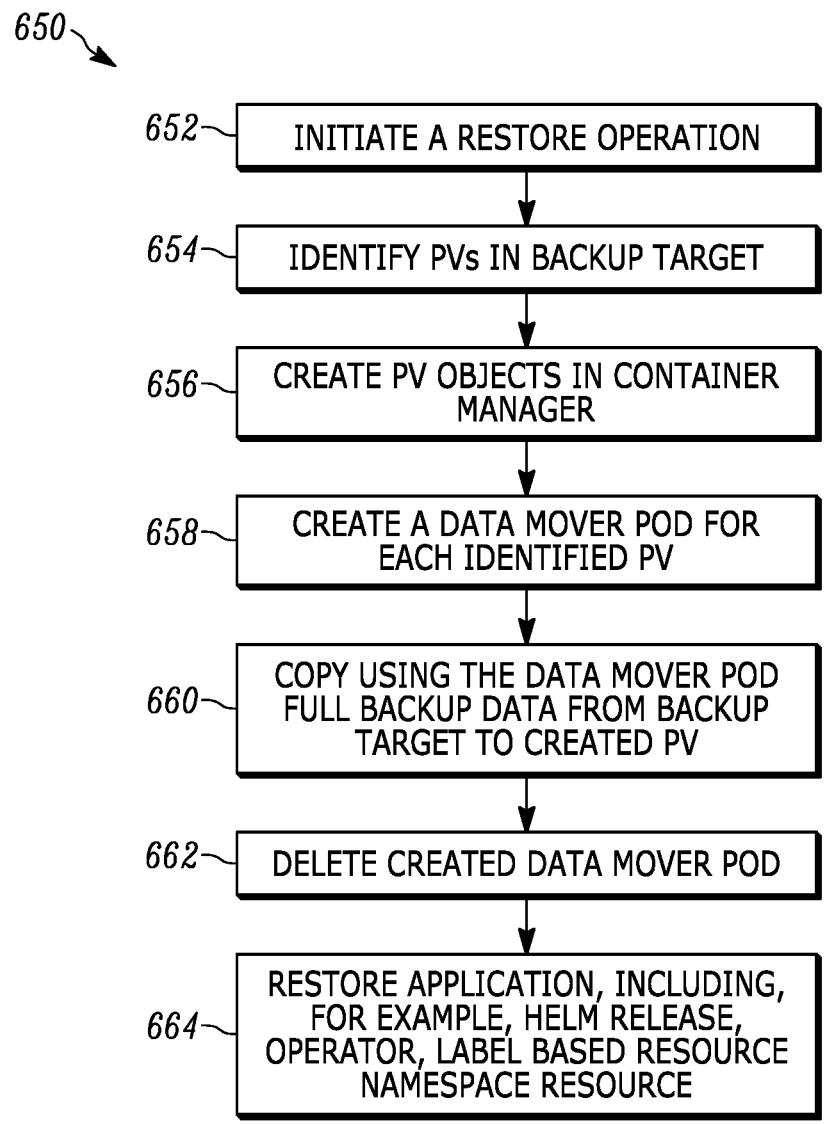
FIG. 6B illustrates a flow diagram for an embodiment of a method of container-based application continuous restore of the present teaching.

FIG. 6B illustrates a flow diagram 650 for an embodiment of a method of container-based application continuous restore of the present teaching. In a first step 652, a restore operation is initiated. The initiation can be triggered by a continuous restore policy. The initiation can be triggered by a user, or in an automated way. The initiation can be a result of a disaster outage. The initiation can be a result of a desire to initiate a failover test. In a second step 654, the PV resources in a backup associated with the application to be recovered are identified. In a third step 656, PVs are created for each identified PV. In some embodiments, the created PVs are PV objects in a container manager, for example a Kubernetes container manager. In a fourth step 658, a data mover pod is created for every created PV. In a fifth step 660, the data mover pod copies the backup data to the created PV. In a sixth step 662, the data mover pods are deleted. In a seventh step 664, the application is restored. This includes restoration of any or all of the Helm release, the operator, the label-based resources and the namespace resources associated with the application.

Figure 7:
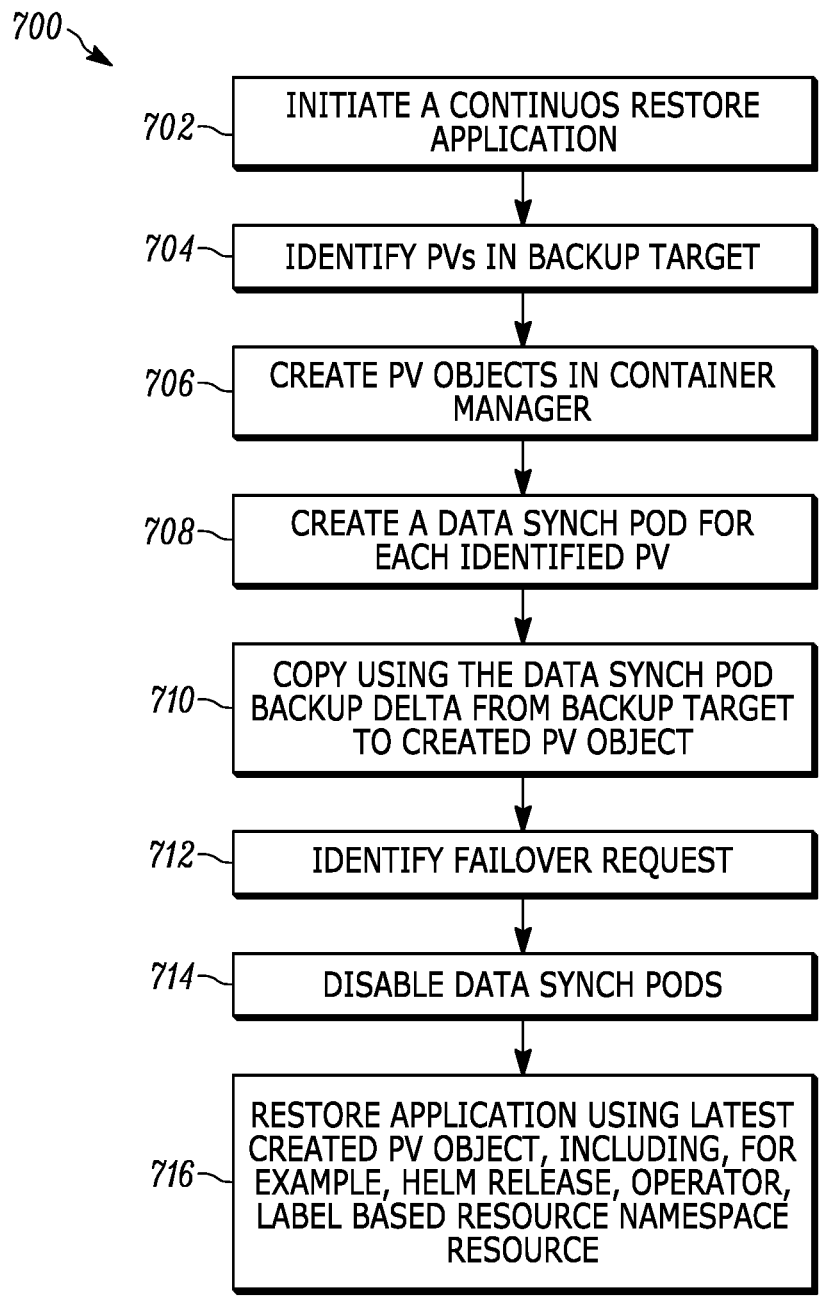
FIG. 7 illustrates a flow diagram for an embodiment of a method of container-based application continuous restore failover of the present teaching.

FIG. 7 illustrates a flow diagram 700 for an embodiment of a method of container-based application continuous restore failover of the present teaching. The workflow of a continuous restore can include some or all of the steps of the method for backup and restore described in connection with FIGS. 6A and 6B. A continuous restore workflow can be configured to support two different operations, failover and test failover. A failover operation is triggered in response to an outage, while a test failover is triggered in response to a scheduled or unscheduled desire to test the failover operation.

In a first step 702, a continuous restore operation for an application is initiated. In a second step 704, the associated PVs for the application are identified in a backup target. In a third step 706, PV objects for the identified PVs are created. In some embodiments the created PVs are PV objects in a container manager, for example a Kubernetes container manager.

In a fourth step 708 a data synch pod is created for each identified PV object. In some embodiments, PVCs are created to data synch pods. Data sync pods are very similar to data mover pods but only apply the latest backup delta to a particular PV. A data synch pod synchronizes PVs to the latest backup contents. In a fifth step 710 the data synch pod copies the latest backup delta from the backup target to the created PV object.

In a sixth step 712, a failover request is identified. In a seventh step 714, the data synch pods are disabled. This ensures no data sync pods are executing. In an eighth step 716 the application is restored, and application recovery is successful. This includes restoration of any or all of the Helm release, the operator, the label-based resources and the namespace resources associated with the application.

In some embodiments, the system and method operates in a test failover mode. This mode includes all the steps for recovery failover use case that were described in connection with the flow diagram 700 described in connection with FIG. 7. Once test failover is completed, all the restored resources are deleted, but not created PVs. These are retained for eventual use in an actual (or future test) failover.

In general, there are three ways businesses implement data replication and recovery for their applications. The first way is an application-level data replication and recovery. Modern distributed applications, for example, Cassandra™, MongoDB™, and other database applications are highly scalable and replicated into multiple geographical locations. The applications that may need to be recovered have logic built into them to maintain consistent copies between different geographical locations. As a result, they transparently failover to healthy sites in case of a disaster outage. The normally executing application and associated computer resources are often referred to as a production application and production site. The healthy, or alternative application and associated computer resources are often referred to as the remote application and remote site.

The approach of replicating the applications in multiple locations has two important requirements that impact the utility. First, the persistent volumes that retain the data in, e.g. the production site and the remote site must be in direct connection to allow consistency of the stateful information in the two sites. Second, additional logic and operational support is required for the remote application to maintain consistency with the production application. One simple example is that software versions must be consistent in both locations.

The second data replication and recovery method is storage level data replication. In this approach, for applications to failover to a remote site, the remote site must have the latest data. Users rely on storage data replication technologies to replicate production data to the secondary sites. Storage replication can be done in two ways.

Figure 8A:
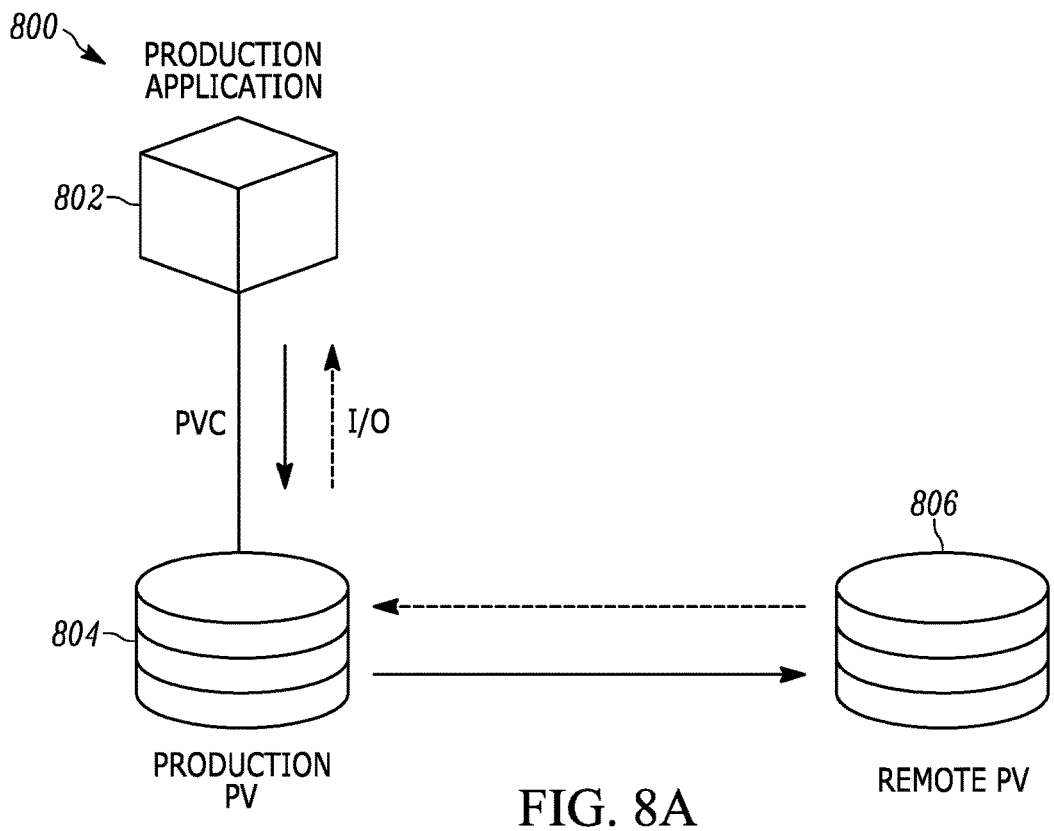
FIG. 8A illustrates a system diagram for a known embodiment of container-based application storage-level data replication and recovery using block-level replication.

The first way is block-level replication where each block is replicated to remote sites consistently. FIG. 8A illustrates a system diagram 800 for a known embodiment of container-based application storage-level data replication and recovery using block-level replication. A production application 802 makes a persistent volume claim, also referred to as a storage request, to a production persistent volume (PV) 804. A remote site persistent volume 806 is directly connected to the production persistent volume 804. Block-level replication can be synchronous replication where every write is written to remote copy before the write is acknowledged to the application. Block-level replication can also be asynchronous replication where the applications' writes are immediately acknowledged and the storage system asynchronously writes the remote copy data.

Figure 8B:
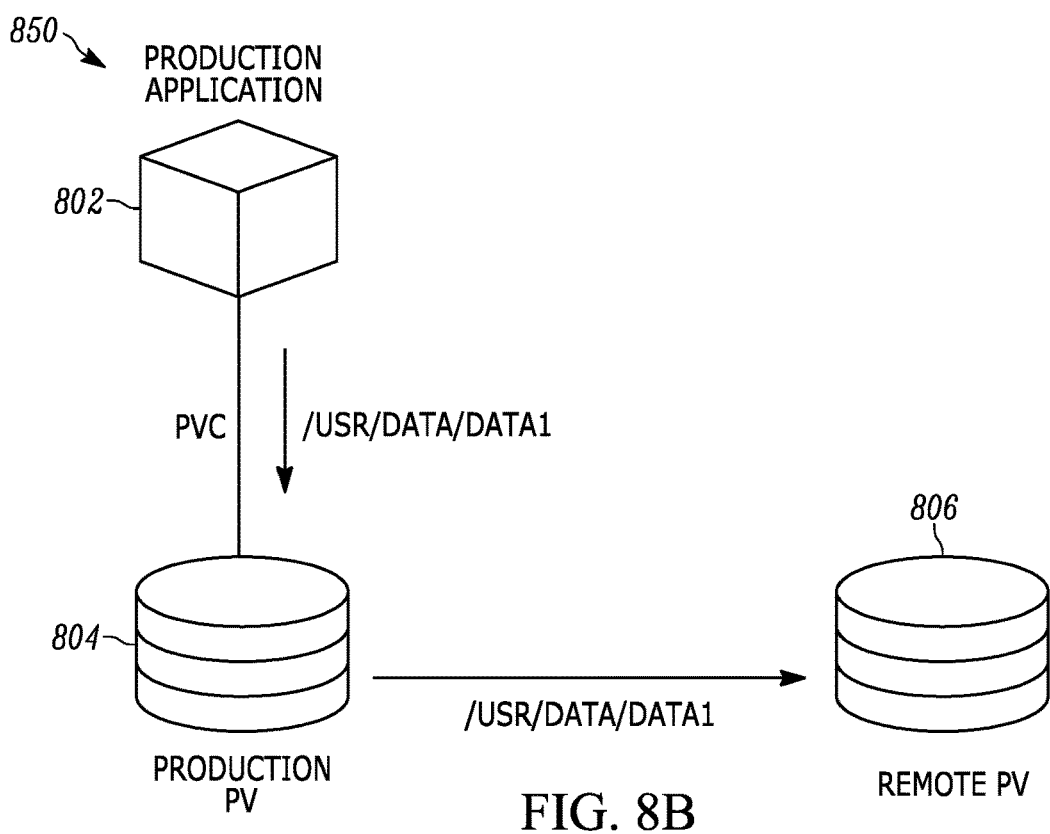
FIG. 8B illustrates a system diagram for a known embodiment of container-based application storage-level data replication and recovery using file-level replication.

The second way is file system level replication where each file is replicated to remote sites consistently. FIG. 8B illustrates a system diagram 850 for a known embodiment of container-based application storage-level data replication and recovery using file-level replication. The setup is the same as that of the known embodiment of container-based application storage-level data replication and recovery using block-level replication. A production application 802 makes a persistent volume claim, also referred to as a storage request, to a production persistent volume (PV) 804. A remote site persistent volume 806 is directly connected to the production persistent volume 804.

A significant challenge with the known methods and systems for continuous restore is the need for a direct connection between the remote site storage and the production site storage. Coordination between remote storage and production storage, as well as the applications using the stored data at production and remote sites is also needed. The direct connection limits scale, because remote sites and production sites must be pairwise connected. In addition, the applications being replicated that run at the remote site and the production site need to be separately maintained and operated. For example, software versions, as well as numerous other known operational functions and features, need to be consistent, requiring significant and coordinated management operations at both sites.

The third approach to data replication and recovery is recovering the application from a backup media. This is a more streamlined and overall can be a more cost-effective option for continuous restore. By contrast, storage-based replication solutions are expensive and difficult to manage, and users typically reserve storage-based replication solutions for mission-critical applications. For applications that do not have stringent recovery point objective (RPO) and/or recovery time objective (RTO) needs, recovering applications from a backup media can be an attractive alternative. In some embodiments, this approach may not provide zero RPO, but with the right workflow, a backup vendor can implement near-instantaneous failover to the remote site. A challenge with known replication via a backup media is that they address only the data, and not the application. As such, backup-media based replication is needed that backs up not just the data, but the entire application, and application template, associated with the application to be backed up.

One significant benefit of the continuous restore method and system of the present teaching is that it operates via a backup media, or target storage volume as described herein. As such, the remote site persistent volume does not need direct connectivity to the production site persistent volume as with the two examples of known systems of FIGS. 8A-B. Rather, the two sites connect to a common backup repository. Additionally, not only can data be backed up and restored, but the entire application and/or application template can be backed up and restored.

Figure 9:
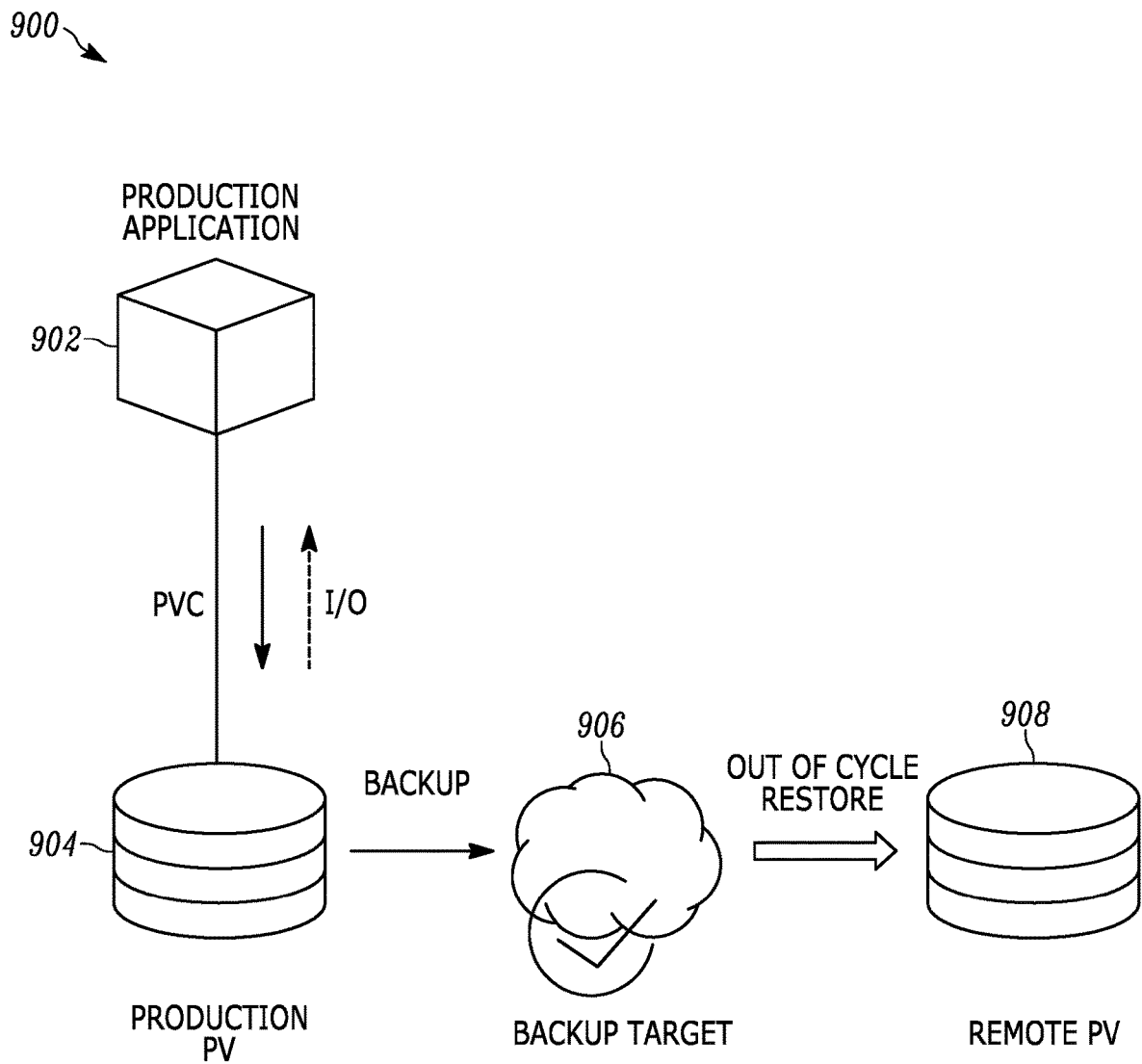
FIG. 9 illustrates a system diagram for an embodiment of container-based application continuous restore failover using backup media of the present teaching.

FIG. 9 illustrates a system diagram for an embodiment of a container-based application continuous restore failover system 900 using backup media of the present teaching. A production application 902 is executing on cloud resources at a production site. For example, the production application 902 could be executing on a particular Kubernetes cluster. The continuous restore system includes a production persistent volume 904 connected to the production application. The recovery application makes a persistent volume claim to the production PV. The PV is connected to a backup target 906, e.g. a storage repository such as a S3 repository. A persistent volume 908 located at a remote site that is different from the production site of PV 904 and application to be recovered 902 is also connected to the backup target 906. In some embodiments, the backup target 906 is S3 storage. In some embodiments, the backup target 906 is NFS storage. A restored application runs at the remote site and connects to the persistent volume 908. The remote persistent volume 908 is synchronized to the backup target 906 using a data synch pod that copies the latest backup delta. In some embodiments the connection between the remote PV 908 and the backup target supports an out of cycle restore.

One feature of the present teaching is that it supports synchronizing backup images with persistent volumes. Though in some embodiments, all the backup images are QCOW2 images, the data capture process varies based on PVC mode. The PVC modes relate to how data should be synched in the data synch pod. In a file system mode, the QCOW2 is with the file system. The data synch pod uses libguestfs to mount the backup QCOW2. The data synch pod synchronizes files with pvmount, similarly to how the restore workflow restores a backup to a PV. For example, in some embodiments, the Inux/Unix command, Rsynch, that is used to copy and synchronize files and directories, can be used to synchronize the latest backup image with the restored PV. In a block mode, the QCOW2 is data blocks. The data sync pod copies a new qcow2 image to data sync pod/NFS location and does qemu-img commit on the restored PV. In a VM boot disk mode, the QCOW2 is data blocks. The data sync pod copies a new QCOW2 image to data mover pod/NFS location and does qemu-img commit on the restored PV data.img file. In VM data disk mode, the QCOW2 is data blocks. The data sync pod copies a new QCOW2 image to data sync pod/NFS location and does qemu-img commit on the restored PV.

One feature of the data recovery system and method of the present teaching is the use of custom resource definitions (CRD) for important tasks, including coordination of backup applications running at different locations for data protection. In some embodiments, these backup applications protect Kubernetes applications. Coordination between the backup applications at a production and a remote site is one example. In some embodiments, a configuration includes one production cluster and one remote cluster. However, there is not a limitation on the number of production clusters and remote clusters that can be used. In fact, in some embodiments, no cluster is designated as a production cluster or a remote cluster. A cluster may be a production cluster for one application and may act as a standby (remote) cluster for another application. As such, good coordination is required between the backup applications when continuous restore workflows are executed.

For example, in some embodiments, when a new backup is created, remote data synch pods need to be communicated about a new backup on the backup target. When new backups are deleted, a corresponding adjustment should be performed on data synch pods, including deleting older backups or the latest backup. When the new backup is full, the data sync pod needs to resync the PV with a full backup image. When new PVs are added/removed on production.

At any given point, the continuous restore workflow must ensure that application data on the remote site is in a consistent state. The data consistency does not necessarily mean that it is in sync with the latest backup. Still, the PVs together hold a consistent copy of the application data, and the application can be restarted without any issues. Remote PVs will discretely transition from a backup to a later backup without ever holding data in an indeterminate state.

To facilitate a robust continuous, restore workflow implementation, a continuous restore data sync CRD, is used at the remote site and a continuous restore plan CRD is used at the production site. The data sync CRD is responsible for managing data synchronization across PVs associated with a backup plan. A custom resource, data sync custom resource, is created with a backup plan on the backup target. The data sync CRD is responsible for spinning data synch pods based on the latest backup. The plan custom resource, which is described in more detail below, is responsible for generating notification events to the data sync custom resource. If the number of PVs is increased from the previous backup, new PVs are created. If the number of PVs is reduced from the previous backup, old PVs are deleted. Data sync pods are spun to synchronize existing PVs data from the latest backup images. Data sync pods can be restarted. The data sync custom resource will have the status of the backup point-in-time that PVs are synched.

The continuous restore plan CRD is responsible for executing continuous restore workflow for a given backup plan. The remote site is assumed to be only synchronized with the latest backup, and the remote site does not have the capability to failover to an arbitrary backup point-in-time. A continuous restore custom resource is created for a backup plan. In the initial release, there is a one-to-one mapping between a backup plan and a remote site for purposes of the following discussion. However, the system and method is not so limited. For example, multiple remote sites are anticipated, and in some embodiments each remote site can support a different point-in-time backup plan. The continuous restore custom resource keeps a watch on the new backups associated with the backup plan. The continuous restore plan CRD notifies on the presence of a new backup plan to the corresponding data synch custom resource.

In some embodiments, a continuous restore custom resource may only choose to notify successful backups and skip any errored backups. A continuous restore custom resource will continue to read the data sync custom resource status to ensure the current data sync operation is successful. The continuous restore custom resource will not notify data sync custom resource of any new backups until the current backup is successfully synchronized with data sync custom resource. In some embodiments, the continuous restore custom resource will have the latest status of the data sync custom resource. In some embodiments, a GUI and the rest of the workflow rely on the continuous restore custom resource status for successful failover/test failover operations.

Another feature of the present teaching is it can support a GUI as an orchestrator for the continuous restore operation. In some embodiments, a user logs into a GUI. The GUI is configured with all relevant clusters that a user would like to manage. All clusters have the continuous restore application installed and support a continuous restore plan CRD and a continuous restore data sync CRD. The user chooses a backup plan that requires continuous restore. The GUI presents an applicable list of clusters/namespaces to the user. Both clusters must have the same target configured, and both clusters have the right version of the continuous restore application installed. In some embodiments, the GUI presents only the clusters that satisfy that condition by some means. The user can choose a cluster/namespace that acts as a continuous restore site for the backup plan. The user can create a continuous restore plan custom resource that corresponds to the backup plan. The GUI displays the latest status of the continuous restore plan and the data sync point with the remote site. Any errors can be correctly presented and, in some methods according the present teaching, corresponding corrective actions are also presented to the user.

One feature of the continuous restore method and system of the present teaching is that it supports status and error handling. Error handling and notifications are important for a continuous restore use case. Error handling needs to accommodate the complications that arise because various distributed entities are involved in the implementation, production, and remote sites. An important requirement is to surface the right metrics to the end-user. These metrics include, for example, a state of remote site synchronization with respect to the production site. This can be, for example, what backup is currently synchronized with the remote site, how much it is lagging from the production site, what backup synchronization is in progress at the remote site, and/or how long it takes to complete the synchronization.

Additional metrics relate to configuration issues, such as PVs that are deleted, a failure to create PVs, PV data synchronization that does not match with backup, and other error conditions requiring prompt notified to the user. In addition, failover and test failover operations must be tracked and reported to the end-user.

Another feature of the present teaching is that it supports replication after failover. For a resilient and flexible continuous restore use case, some embodiments continue to do replication in the reverse direction after a failover. One feature of the present teaching is that very little if any centralized information technology administration is needed, thereby reducing total cost of ownership. Incremental backups can be automatically scheduled on a pre-defined or on-demand basis. Backups can be easily tested prior to recovery and can be stored in the open QCOW2 format. The system may quickly recover any Kubernetes, or other kind, of containerized application. The system may selectively restore containers and applications to the same or new name space.

Figure 10:
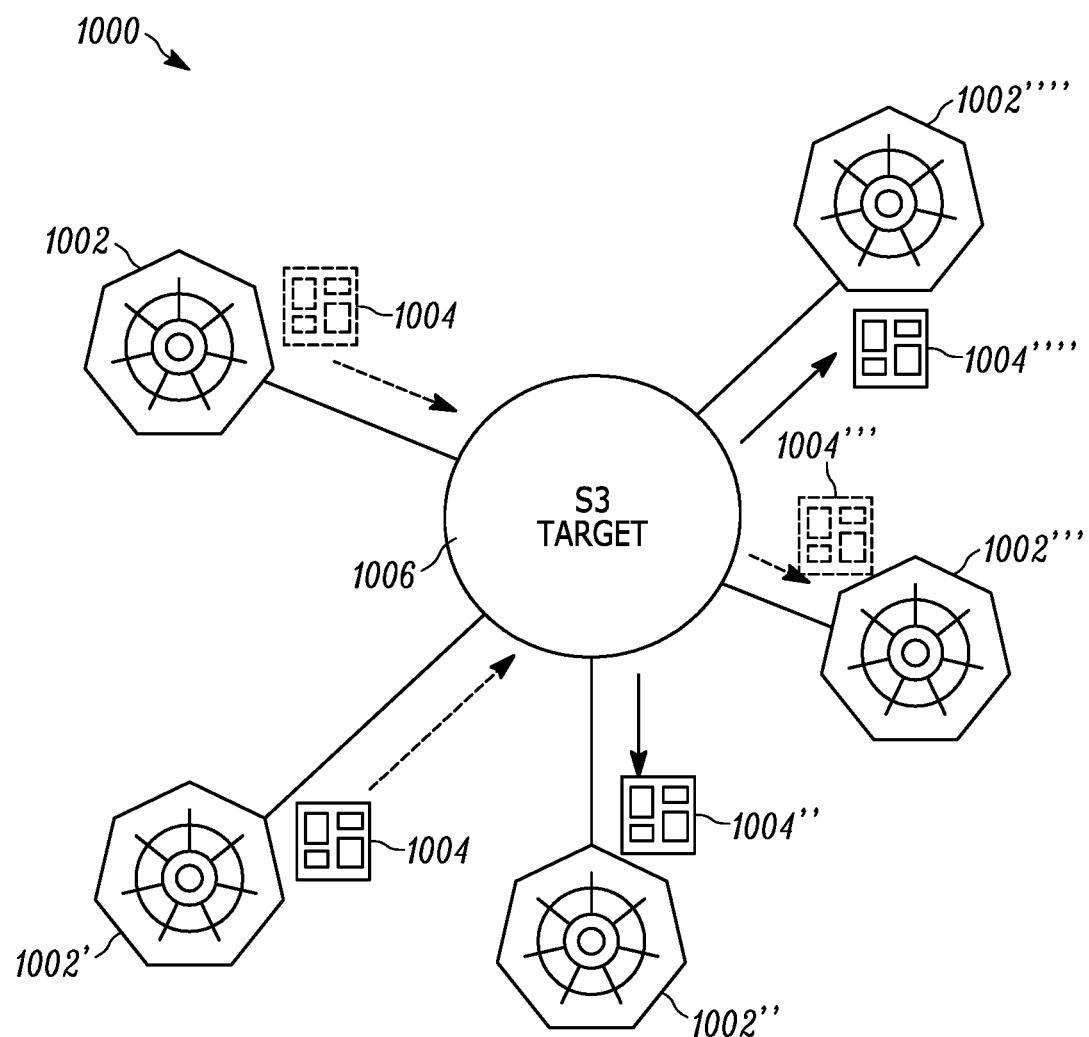
FIG. 10 illustrates an embodiment of a multi-cloud and/or multi-cluster environment running a multisite continuous restore application of the present teaching.

One feature of the present teaching is that it can be configured as a multisite replication system. FIG. 10 illustrates an embodiment of a multi-cloud and/or multi-cluster environment 1000 running a multisite continuous restore application of the present teaching. A star network configuration is shown. In general, there are no limits on the network topology or the number of sites that continuous restoration applications of the present teaching can support. For example, enterprises can use multiple public clouds and/or private clouds to implement the computer infrastructure that runs the applications to be backed up. In some embodiments, various configurations of Kubernetes clusters 1002, 1002', 1002", 1002'", 1002"" can run on either or both of the public and private cloud infrastructure (not shown). For example, each Kubernetes cluster can serve as a continuous replication target for any application 1004, 1004', 1004", 1004'", 1004"" running on any other Kubernetes cluster 1002, 1002', 1002", 1002'", 1002"". The target storage volume in this embodiment is an S3 target 1006. As illustrated in this embodiment of a multi-cloud and/or multi-cluster environment 1000 running a multisite continuous restore application, one feature of the present teaching is that it does not require direct connectivity between a particular cluster that is operating as a production site and a cluster operating as a remote site. This feature can substantially improve scale, cost and/or complexity as compared, for example, to prior art data replication systems that utilize storage-level data replication, such as the known systems described in connection with FIGS. 8A-B, above.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A computer-implemented method of continuous restore for containerized applications, the method comprising:
   a) initiating a continuous restore process for a containerized application executing on a first cluster;
   b) generating a backup plan comprising a backup plan schedule for the containerized application;
   c) identifying a persistent volume containing application data of the containerized application in the first cluster, creating a new persistent volume from a snapshot of the identified persistent volume, and creating a data mover pod executing on the first cluster for moving at least some of the application data from the new persistent volume to a backup target based on the backup plan schedule;
   d) deleting the data mover pod, the new persistent volume, and the snapshot;
   e) responsive to receiving the backup plan and deleting the data mover pod, the new persistent volume, and the snapshot,
      creating, by a data synch pod executing on a second cluster, a persistent volume on the second cluster, and
      moving, by the data synch pod executing on the second cluster, at least some of the application data from the backup target to the created persistent volume on the second cluster based on the backup plan schedule, wherein at least one of the persistent volume on the first cluster or the persistent volume on the second cluster is located remotely from the backup target; and
   f) recovering the containerized application at the second cluster based on at least some of the application data moved to the persistent volume on the second cluster such that the recovered containerized application is operational at a most recent backup point-of-time of the backup plan schedule.

2. The computer-implemented method of claim 1, wherein the container application includes an application template, and the application template comprises at least one of a release, an operator, a label or a namespace.

3. The computer-implemented method of claim 1, wherein the moving at least some of the application data from the backup target to the created persistent volume on the second cluster comprises moving using a persistent volume claim to a production persistent volume.

4. The computer-implemented method of claim 2, wherein the recovering the containerized application at the second cluster comprises shutting down a data synch process.

5. The computer-implemented method of claim 4, wherein the recovering the containerized application at the second cluster further comprises executing the application template to generate an application skeleton, subsequently shutting down the application skeleton and rebooting the application skeleton to restore the containerized application.

6. The computer-implemented method of claim 1, wherein the backup plan comprises a recovery point objective that is a last incremental backup in the backup plan.

7. The computer-implemented method of claim 1, further comprising generating a change to the backup plan.

8. The computer-implemented method of claim 7, wherein the generating the change to the backup plan is initiated using a graphical user interface.

9. The computer-implemented method of claim 7, further comprising notifying the data synch pod of the change to the backup plan.

10. The computer-implemented method of claim 7, further comprising increasing a number of persistent volumes using the data synch pod based on the change to the backup plan.

11. The computer-implemented method of claim 7, further comprising decreasing a number of persistent volumes using the data synch pod based on the change to the backup plan.

12. The computer-implemented method of claim 1, further comprising determining a status of the data synch pod using the continuous restore process.

13. The computer-implemented method of claim 1, wherein the application template comprises a Helm chart.

14. The computer-implemented method of claim 1, wherein the container application includes an application template, and the application template comprises at least one of a common resource descriptor (CRD), an IP address, a network configuration, a virtual machine, a number of virtual machines, an operating system, and a software version number.

15. The computer-implemented method of claim 1, wherein the backup target comprises a simple storage service (S3) backup target.

16. The computer-implemented method of claim 1, wherein the first cluster comprises resources of a cloud service, and the second cluster comprises resources of a different cloud service.

17. The computer-implemented method of claim 1, wherein the first cluster comprises a namespace, and the continuous restore process executes on resources within the namespace.

18. A computer-implemented method of continuous restore for containerized applications, the method comprising:
   a) presenting a managed set of clusters in a graphical user interface;
   b) identifying a request to initiate a continuous restore process for a selected production site cluster and at least one selected remote site cluster with the graphical user interface;
   c) initiating the continuous restore process for a containerized application executing on the selected production site cluster in response to the identified request;
   d) generating a backup plan comprising a backup plan schedule for the containerized application;
   e) identifying a persistent volume containing application data of the containerized application in the selected production site cluster, creating a new persistent volume from a snapshot of the identified persistent volume, and creating a data mover pod executing on the selected production site cluster for moving at least some of the application data from the new persistent volume to a backup target based on the backup plan schedule;

f) deleting the data mover pod, the new persistent volume, and the snapshot;

g) responsive to receiving the backup plan and deleting the data mover pod, the new persistent volume, and the snapshot, creating, by a data synch pod executing on at least one selected remote site cluster, a persistent volume on the at least one selected remote site cluster; and moving, by the data synch pod executing on at least one selected remote site cluster, at least some of the application data from the backup target to the created persistent volume on the at least one selected remote site cluster based on the backup plan schedule, wherein at least one of the persistent volume on the selected production site cluster and the persistent volume on the at least one selected remote site cluster is located remotely from the backup target;

h) recovering the containerized application at the at least one remote site cluster based on the at least some of the application data moved to the persistent volume on the at least one remote site cluster such that the recovered containerized application is operational at a most recent backup point-of-time of the backup plan schedule; and i) presenting in the graphical user interface a status of the data synch pod.

19. The computer-implemented method of claim 18, wherein the status comprises a latest data synchronization point of the selected at least one selected remote site cluster.

20. The computer-implemented method of claim 18, further comprising identifying using the graphical user interface a request to change the backup plan.

21. The computer-implemented method of claim 20, further comprising increasing a number of persistent volumes using the data synch pod based on the requested change to the backup plan.

22. The computer-implemented method of claim 18, wherein the container application includes an application template, and the application template comprises at least one of a release, an operator, a label or a namespace.

* * * * *